United States Patent [19]

Fukui

[11] 4,198,065
[45] Apr. 15, 1980

[54] PISTON RING FOR INTERNAL COMBUSTION ENGINE

[75] Inventor: Takeo Fukui, Tokyo, Japan

[73] Assignee: Honda Giken Kogyo Kabushiki Kaisha, Tokyo, Japan

[21] Appl. No.: 22,802

[22] Filed: Mar. 22, 1979

[30] Foreign Application Priority Data

Mar. 31, 1978 [JP] Japan .............................. 53-40949[U]

[51] Int. Cl.$^2$ .............................................. F16J 9/00
[52] U.S. Cl. ....................................... 277/217; 92/177
[58] Field of Search .................. 277/216, 217; 92/233, 92/213, 177

[56] References Cited

U.S. PATENT DOCUMENTS

| | | | |
|---|---|---|---|
| 927,190 | 7/1909 | Thompson | 277/216 |
| 1,406,475 | 2/1922 | Morgal | 277/217 |
| 2,120,033 | 6/1938 | Moore | 92/233 |
| 2,130,923 | 9/1938 | Jardine | 92/177 |
| 2,257,417 | 9/1941 | Kelley | 92/177 |
| 2,983,256 | 5/1961 | Seeloff | 92/177 |

Primary Examiner—Robert I. Smith
Attorney, Agent, or Firm—Lyon & Lyon

[57] ABSTRACT

A four cylinder four cycle spark ignition engine has oblong pistons each mounted to reciprocate within an oblong cylinder. Each piston is elongated in a direction parallel to the axis of the crankshaft and is provided with piston rings which have sliding contact with the surface of the oblong cylinder. Each piston ring is split at one side, and the free shape thereof prior to installation is such as to give superior results after installation when the engine is operated at high speed and high performance.

1 Claim, 4 Drawing Figures

PISTON RING FOR INTERNAL COMBUSTION ENGINE

This invention relates to internal combustion engines and is particularly directed to improvements which include oblong pistons mounted to reciprocate in sliding contact with oblong cylinders, for the purpose of producing a high speed engine having a high horsepower output. In order to improve the horsepower output for each liter of displacement, it has been proposed to increase the maximum engine speed of revolution. However, there are certain disadvantages in this approach. First, in the range of high revolution speeds, as the engine speed increases the volumetric efficiency falls off. In order to increase the engine speed while maintaining volumetric efficiency at a certain value, it is necessary for the cylinder to be provided with fresh charges of air in an amount proportional to the engine speed of revolution. However, it is known that the velocity of air no longer increases when it reaches about 0.5 mach, and consequently the volumetric efficiency begins to decrease. In order to obtain higher values for volumetric efficiency, therefore, it is necessary to enlarge the effective opening area of the intake valves. Factors affecting the effective opening area of the intake valves include peripheral length, number of the intake valves, and lift of the intake valves.

Another difficulty with increasing the speed of engine revolutions is that the valve operating mechanism becomes unreliable. When the engine speed exceeds a maximum speed range, difficulties are encountered with valve jump, valve bounce, etc. The critical speed of revolution at which such phenomena occur is generally proportional to the square root of the valve spring force, and is inversely proportional to the square root of the least acceleration of the valve. The maximum speed of revolution is limited to that which is determined by these factors.

Furthermore, the upper limit of the engine speed of revolution is soon reached, because the inertia load of the reciprocating parts moving with the piston, connecting rod, etc., is proportional to the square of the speed of revolution. Mechanical losses increase abruptly in the range of high speeds.

In order to overcome these problems encountered with high engine speeds, short strokes have been proposed, but there exists a critical range for shorter strokes in order to maintain an effective compression ratio and a combustion chamber configuration on an established displacement. Another proposal for improving power performance has been to improve combustion efficiency, achieved by increasing the compression ratio. However, an excessively high compression ratio produces pre-ignition or knocking. Known characteristics peculiar to fuel, combustion chamber configuration, and ignition timing permit only small increases in performance, and further substantial improvement in performance is not to be expected. Accordingly, proposals for shorter strokes and raised compression ratios have not resulted in significant improvements in performance.

In a companion case filed of even date herewith in the names of Shoichiro Irimajiri and Takeo Fukui and entitled "Oblong Piston and Cylinder for Internal Combustion Engine", which is incorporated herein by reference, there is disclosed additional details of the engine features described and claimed in this application. In that related application an improvement in volumetric efficiency is relied upon to improve the power performance of conventional four cycle gasoline-powered internal combustion engines. The present application is concerned with the construction of split piston rings on an oblong piston in order to achieve substantially uniform pressure distribution and to minimize fluttering during high speed operation. The periphery of a piston ring for an oblong piston may have circular arc portions and straight portions and therefore uniform pressure distribution during its insertion into the cylinder is difficult to obtain. Consequently, undesirable fluttering develops during high speed operation.

Other and more detailed objects and advantages will appear hereinafter.

Figure 1:
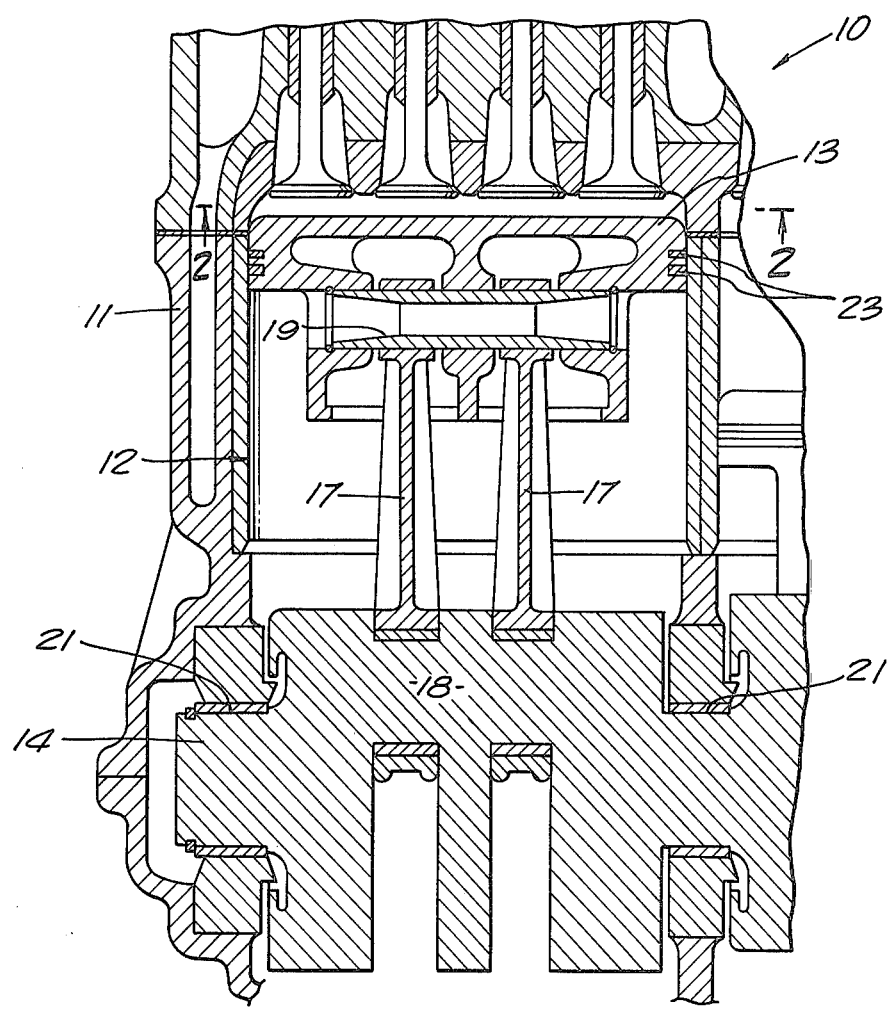
FIG. 1 is a sectional side elevation partly broken away, showing an internal combustion engine having an oblong piston reciprocating within an oblong cylinder.

Referring to the drawings, the engine generally designated 10 has a body 11 provided with four parallel upright cylinders 12. A piston 13 reciprocates in each of the cylinders 12 but the cooperating sliding surfaces of each piston and cylinder are not cylindrical. Instead, each piston and cylinder is elongated in a direction parallel to the rotary axis of the crankshaft 14.

Figure 2:
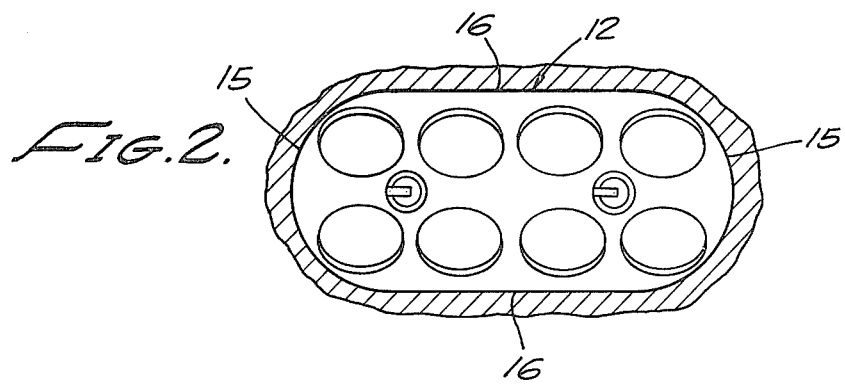
FIG. 2 is a sectional detail taken substantially on the lines 2—2 as shown on FIG. 1.

As best shown in FIG. 2, each cylinder 12 is oblong, that is, having a greater dimension in one direction than in another direction at right angles thereto. The cylinder 12 preferably has curved ends 15 which each constitute a part of a circle, in cross section, these curved ends 15 being joined by side surfaces 16 which are preferably in the form of parallel planes. However, the side surfaces 16 may be arched to increase the lateral dimension of the cylinder, or the cross section of the cylinder may be in the form of an ellipse. It is intended that the term "oblong" cover any of these shapes. Each cylinder 12 is symmetrical about a plane passing through the longest of the cylinder cross sections.

Two duplicate connecting rods 17 connect each piston 13 to a crank throw 18 formed on the crankshaft 14. Each connecting rod 17 has a portion encircling the pin 19 mounted in the piston 13 and extending in a direction parallel to the axis of the crankshaft 14.

The oblong piston 13 has one or more split piston rings 23 which are in sliding contact with the oblong cylinder 12. Each of these piston rings has the shape shown in FIG. 3 prior to assembly into its groove on the periphery of the oblong piston 13. A curved end 24 is formed as the arc of a circle of radius $\gamma R$ with point $0'$ as its center. The duplicate straight portions 25 extend from the circular arc 24 to the duplicate arc portions 26. The gap between the ends E and $E_1$ is substantial and permits easy installation of the piston ring 23 onto the oblong piston 13.

The cross sectional internal surface of the cylinder 12 is shown at 27 and has the shape of an elongated circle, the left and right ends of which have the same circular arcs of radius $\gamma C$ with point 0 as its center. The circular arcs are connected respectively to each other by straight lines BC and B'C' of the same length. The piston ring 23 has its free shape formed with a circular arc 24 of radius R with point 0' as its center so as to be inscribed within said radius γR. The straight side portions 25 join the circular arc 24 by intersecting perpendicularly straight lines 0'A and 0'A' on the central angle 2α of the circular arc 24, where α=90°×γC/γR. The circular arcs 26 join the straight side portions 25 at points D and D' at the same length as the straight line BC and having radius γC with point 0", 0''' on the straight portions 25 as its center. The central angle β is determined emperically from the results of repeated tests, considering the rate of gas leakage, etc.

Figure 3:
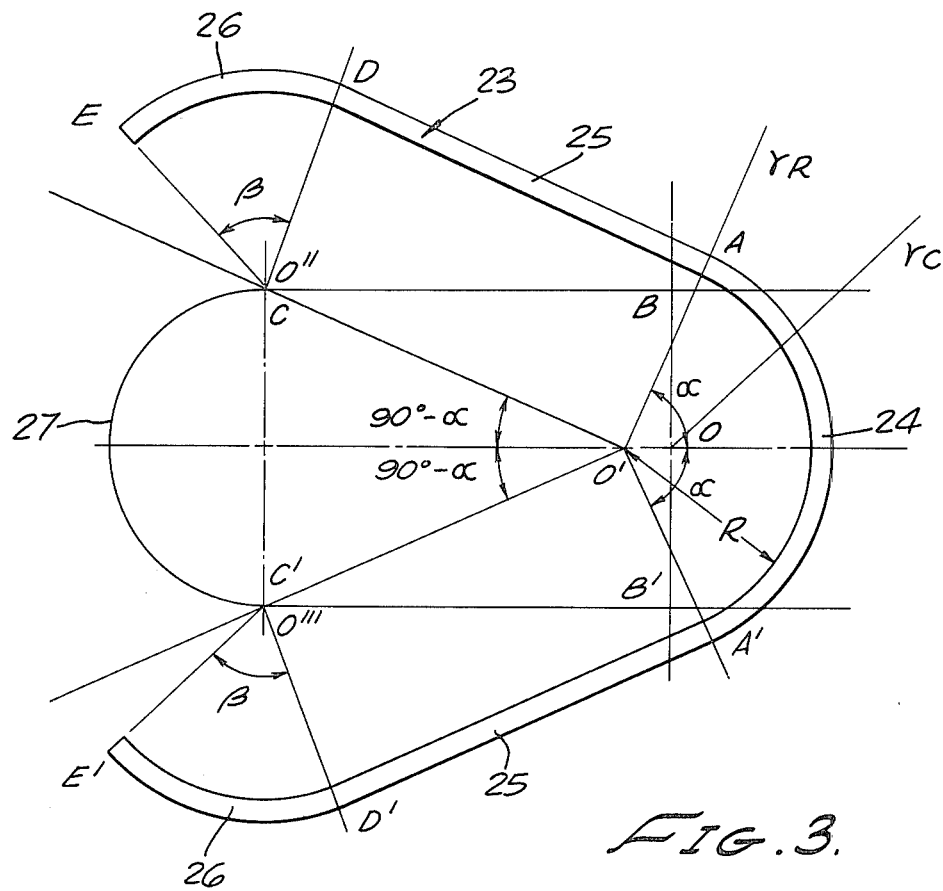
FIG. 3 shows a split piston ring constituting a preferred embodiment of this invention.
Figure 4:
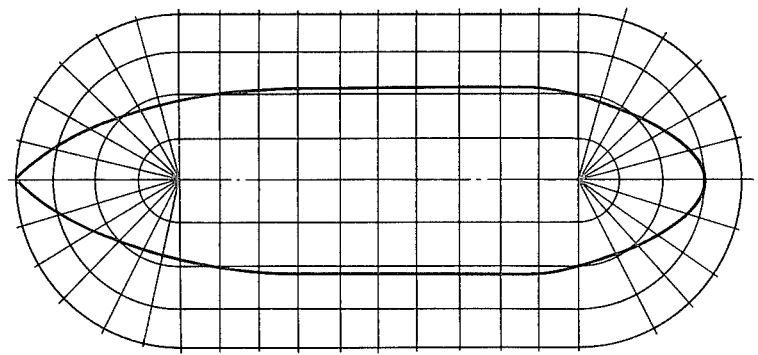
FIG. 4 is a chart showing pressure distribution of the split piston ring shown in FIG. 3.

When the piston ring 23 as shown in FIG. 3 is inserted into its enclosing cylinder 12, the pressure distribution is practically uniform as shown in FIG. 4 by virtue of the circular arc 24 and straight portions 25. Because the split piston ring 23 has a peak point at its gap, after insertion, it is effective to prevent excessive fluttering during high speed operation of the engine.

Having fully described my invention, it is to be understood that I am not to be limited to the details herein set forth but that my invention is of the full scope of the appended claim.

I claim:

1. For use in an internal combustion engine having an oblong piston mounted to reciprocate within an oblong cylinder having arcuate end portions, a piston ring adapted to be received within a peripheral groove on the piston, the piston ring in its free state before installation having straight side portions of equal length each having one end merging with a relatively longer arcuate portion of the ring, the other ends of said straight portions merging with first and second relatively shorter arcuate portions of the piston ring, said shorter arcuate portions defining between them a gap, the free shape of the piston ring having the following characteristics:

$$0-0'=\gamma R-\gamma C$$

$$\alpha=90°\times\gamma C/\gamma R$$

$$\beta<\alpha$$

$$AD=BC$$

$$\angle 0'AD=90°=\angle 0'A'D'$$

$$D0''=D'0'''=\gamma R$$

where
- 0 = center of the radius of the arcuate end portions of the cylinder
- 0' = center of the radius of the relatively longer arcuate portion of the piston ring
- 0'' = center of the radius of the first relatively shorter arcuate portion of the piston ring
- 0''' = center of the radius of the second relatively shorter arcuate portion of the piston ring
- γR: radius of the relatively longer arcuate portion of the piston ring
- γC: radius of the arcuate end portions of the cylinder
- A and D: ends of one straight portion of the piston ring
- A' and D': ends of the other straight portion of the piston ring
- B and C: ends of one straight portion of the cylinder
- α: angle between the longitudinal axis of the piston ring and a line between 0' and the point where either straight side portion of the piston ring merges with the relatively longer arcuate portion of the ring
- E: end of the first relatively shorter arcuate portion of the piston ring
- E': end of the second relatively shorter arcuate portion of the piston ring
- β: ∠D0''E = ∠D'0'''E'.

* * * * *